United States Patent
Irvine et al.

(10) Patent No.: US 11,271,216 B2
(45) Date of Patent: Mar. 8, 2022

(54) METHOD FOR PRODUCING AN ELECTRODE CATALYST FROM A PEROVSKITE METAL OXIDE

(71) Applicant: University Court of the University of St Andrews, St Andrews (GB)

(72) Inventors: John T. S. Irvine, Fife (GB); Jae-Ha Myung, Fife (GB); Dragos Neagu, Newcastle (GB); David Miller, Fife (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 0 days.

(21) Appl. No.: 16/316,250

(22) PCT Filed: Jul. 7, 2017

(86) PCT No.: PCT/GB2017/052002
§ 371 (c)(1),
(2) Date: Jan. 8, 2019

(87) PCT Pub. No.: WO2018/007826
PCT Pub. Date: Jan. 11, 2018

(65) Prior Publication Data
US 2019/0190031 A1    Jun. 20, 2019

(30) Foreign Application Priority Data
Jul. 8, 2016 (GB) .................................... 1611953

(51) Int. Cl.
*H01M 4/86* (2006.01)
*H01M 8/1213* (2016.01)
(Continued)

(52) U.S. Cl.
CPC ....... *H01M 4/8621* (2013.01); *H01M 4/8835* (2013.01); *H01M 8/1213* (2013.01); *H01M 2008/128* (2013.01)

(58) Field of Classification Search
CPC ........ H01M 4/86; H01M 4/8621; H01M 4/88; H01M 4/8835; H01M 8/1213
See application file for complete search history.

(56) References Cited

U.S. PATENT DOCUMENTS

2016/0087274 A1*  3/2016  Nakayama ............ H01M 4/485
429/231.6

FOREIGN PATENT DOCUMENTS

KR    10-2012-0070665    7/2012

OTHER PUBLICATIONS

Irvine, T.S. John et al., "Nanomaterials at the edge: perovskite exsolutions", Nanostructured Electromaterials for Energy, Jan. 18-19, 2016, 32 pages. (Year: 2016).*

(Continued)

*Primary Examiner* — Karie O'Neill Apicella
(74) *Attorney, Agent, or Firm* — Christopher J. Knors; Moore & Van Allen PLLC

(57) ABSTRACT

The invention relates to a method of producing electrode materials for solid oxide cells which comprises applying an electric potential to a metal oxide which has a perovskite crystal structure. The resultant electrode catalyst exhibits excellent electrochemical performance. The invention extends to the electrode catalyst itself, and to electrodes and solid oxide cells comprising the electrode catalyst.

16 Claims, 6 Drawing Sheets

(51) Int. Cl.
*H01M 4/88* (2006.01)
*H01M 8/12* (2016.01)

(56) References Cited

OTHER PUBLICATIONS

Tsekouras, George et al., "Step-change in high temperature steam electrolysis performance of perovskite oxide cathodes with exsolution of B-site dopants", 2013, Energy and Environmental Science, 6, 256-266. (Year: 2013).*
European Patent Office; International Search Report for International Patent Application No. PCT/GB2017/052002 dated Sep. 28, 2017.
Yaqub Azra, et al.; "Synthesis and characterization of B-site doped La0.20SR0.25CA0.45TiO03 as SOFC anode materials," International Journal of Hydrogen Energy, 2015, pp. 760-766.
Irvine, John T.S., et al.; Evolution of the electrochemical interface in high-temperature fuel cells and electrolysers, Nature Energy, 2016, pp. 1-13.
Jiang, San Ping; "A review of wet impregnation—An alternative method for the fabrication of high performance and nano-structured electrodes of solid oxide fuel cells," Materials Science and Engineering, 2006, pp. 199-210.
Jung, Woochul, et al.; "Robust nanostructures with exceptionally high electrochemical reaction activity for high temperature fuel cell electrodes," Energy & Environmental Science, 2014, pp. 1685-1692.
Nishihata, Y., et al.; "Self-regeneration of a Pd-perovskite catalyst for automotive emissions control," Nature, 2002, pp. 164-167.
Neagu, Dragos, et al.; "In situ growth of nanoparticles through control of non-stoichiometry," Nature Chemistry, 2013, pp. 916-923.
Neagu, Dragos, et al.; "Nano-socketed nickel particles with enhanced coking resistance grown in situ by redox exsolution," Nature Communications, 2015, pp. 1-8.
Sengodan, Sivaprakash, et al.; Layered oxygen-deficient double perovskite as an efficient and stable anode for direct hydrocarbon solid oxide fuel cells. Nature Materials, 2014, pp. 205-209.
University Court of the University of St Andrews, International Application No. PCT/GB2017/052002, International Preliminary Report on Patentability, dated Jan. 17, 2019.
University Court of the University of St Andrews, British Application No. GB1611953.9, Search Report, dated Feb. 14, 2017.
Graves, C., et al., Eliminating degradation in solid oxide electrochemical cells by reversible operation, Nature Materials, Feb. 2015, pp. 239-244, vol. 14.
Irvine, J.T.S., et al., Alternative Materials for SOFCs, Opportunities and Limitations, Green Energy and Technology, 2013, pp. 163-180.
Kobsiriphat, W., et al., Nickel- and Ruthenium-Doped Lanthanum Chromite Anodes: Effects of Nanoscale Metal Precipitation on Solid Oxide Fuel Cell Performance, Journal of the Electrochemical Society, 2010, pages B279-B284, vol. 157, No. 2.
Tsekouras, G., et al., The role of defect chemistry in strontium titanates utilised for high temperature steam electrolysis, Journal of Materials Chemistry, 2011, pp. 9367-9376, vol. 21.
Neagu, D., et al., Structure and Properties of La0.4Sr0.4TiO3 Ceramics for Use as Anode Materials in Solid Oxide Fuel Cells, Chemistry of Materials, 2010, pp. 5042-5053, vol. 22.
Irvine, J.T.S., et al., Nanomaterials at the edge: perovskite exsolutions, Nanostructured Electromaterials for Energy, Jan. 18-19, 2016, 32 pages.
Boulfrad, S., et al., Pre-coating of LSCM perovskite with metal catalyst for scalabe high performance anodes, International Journal of Hydrogen Energy, 2013, pp. 9519-9524, vol. 38.
Zhou, X., et al., Synthesis and electrocatalytic performance of La0.3Ce0.1Sr0.5Ba0.1TiO3 anode catalyst for solid oxide fuel cells, Electrochemistry Communications, 2014, pp. 79-82, vol. 43.
Tsekouras, George, et. al.; "Step-change in high temperature steam electrolysis performance of perovskite oxide cathodes with exsolution of B-site dopants," Energy & Environmental Science, 2013, pp. 256-266.
Cassidy, M. et. al.; "Application of Exsolved Structures as a Route to More Robust Anodes for Improved Biogas Utilisation in SOFCs," ECS Transactions, 2015, pp. 2029-2036.

* cited by examiner

METHOD FOR PRODUCING AN ELECTRODE CATALYST FROM A PEROVSKITE METAL OXIDE

CROSS-REFERENCE TO RELATED APPLICATIONS

This application is a 35 U.S.C. § 371 National Stage Application of International Application No. PCT/GB2017/052002, filed Jul. 7, 2017, which claims the benefit of United Kingdom Application No. 1611953.9 filed on Jul. 8, 2016, the entirety of each of which is incorporated herein by reference.

FIELD OF THE INVENTION

The invention relates to a method of producing electrode materials for solid oxide cells. In particular, the invention relates to a method of producing an electrode catalyst comprising applying an electric potential to a metal oxide which has a perovskite crystal structure. The method is extremely efficient. The resultant electrode catalyst exhibits excellent electrochemical performance. The invention extends to the electrode catalyst itself, and to electrodes and solid oxide cells comprising the electrode catalyst.

BACKGROUND OF THE INVENTION

Solid oxide fuel cells (SOFCs) and solid oxide electrolyser cells (SOECs) are jointly referred to as solid oxide cells (SOCs). SOFCs offer an efficient alternative to combustion technology for electricity production and SOECs offer enhanced efficiency in the conversion of steam and carbon dioxide to hydrogen and carbon monoxide, respectively. Solid oxide cells consist of two porous electrodes, the $H_2$ (fuel) electrode and the $O_2$ (air) electrode, separated by a dense electrolyte. While several high performance air electrode materials have been identified: the ideal fuel electrode material has yet to be found due to the numerous requirements it must fulfil, chief among them being electronic and ionic conductivity, and catalytic activity for desirable reactions (e.g. water splitting and $H_2$ oxidation).[1] For a long time, cermets (ceramic metal composites) consisting of Ni metal and yttria-stabilised zirconia have been regarded as the embodiment of this functional trinity. However, even though degradation associated with reversible operation can be mitigated,[2] cermet anodes are susceptible to many other forms of degradation.[3] To alleviate this, recently electrode designs have evolved to microstructures consisting of a porous mixed ionic electronic conductor backbone decorated with metallic nanoparticles (typically Ni)[1,4]. These structures are generally formed by multistep procedures (e.g. physical deposition[5] or chemical infiltration[4]) and require dedicated precursors, equipment and usually several days to complete. A simpler alternative is redox exsolution by which the catalytically active metal is substituted in the crystal lattice of the backbone in oxidizing conditions, forming a solid solution, and is then released (exsolved) on the surface as metal particles upon exposure to $H_2$ atmosphere (henceforth referred to as reduction by hydrogen).[6-8] While this procedure can be carried out in situ and in one step, bringing obvious simplifications to cell manufacture, it is still relatively lengthy (10-30 hours) due to the relatively slow ion diffusion in oxides across bulk and surfaces.[8,9] Additionally, this may limit the overall extent of exsolution and therefore the final surface particle population resulting in unimpressive electrochemical performance.

The key technical challenges that to be addressed in advancing this technology are performance, durability and cost. All three need to be achieved in parallel; however, often, competitive tensions exist meaning that, e.g., performance is achieved at the expense of durability. The greatest challenge facing solid oxide cells, in both solid oxide fuel cell (i.e. SOFC) mode and solid oxide electrolysis cell (i.e. SOEC) mode, is to deliver high, long-lasting electrocatalytic activity while ensuring cost and time-efficient electrode manufacture.

The present invention seeks to address one or more of the above-identified problems and/or challenges.

SUMMARY OF THE INVENTION

In a first aspect, the invention provides a method of producing an electrode catalyst comprising applying an electric potential to a perovskite metal oxide.

The present invention is based on the finding that applied electrical potentials can be instrumental in controlling the driving force for exsolution of metal in perovskite metal oxides, and can significantly enhance exsolution to generate—virtually instantly—rich nanostructures with outstanding electrochemical activity and stability. In particular, it has been found, when compared to traditional perovskite metal oxide reduction by $H_2$, applying an electrical potential to the perovskite metal oxide can enable exsolution that is faster by more than two orders of magnitude, a surface metal particle population that is several times higher and electrochemical performance that is increased by about one order of magnitude.

In a second aspect, the invention provides an electrode catalyst obtainable or obtained by the method of the first aspect of the invention. The electrode catalyst comprises a perovskite metal oxide-based lattice supporting metal particles. The metal particles are exsolved metal particles, are small in size and they densely populate the lattice surface. It is believed that the metal particles are created at key interfaces for electrocatalytic activity.

In a third aspect, the invention provides an electrode comprising the electrode catalyst of the second aspect of the invention.

In a fourth aspect, the invention provides a solid oxide cell comprising the electrode of the third aspect of the invention.

In a further aspect, the invention provides a method of regenerating an electrode catalyst according to the second aspect of the invention, which method comprises applying an electrical potential to the electrode catalyst. It has been found that electrocatalytic performance of an electrode catalyst that has deteriorated at a nanostructure level over time, can be restored by this method.

DETAILED DESCRIPTION OF THE INVENTION

Figures 1A, 1B, 1C:
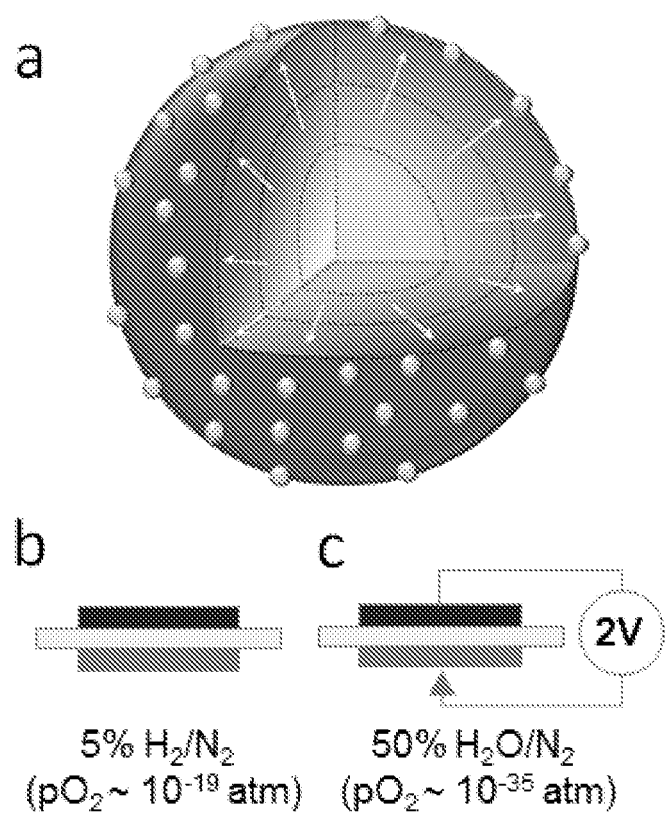
FIG. 1(a) is a schematic representation of exsolution of metal from within a metal oxide crystal lattice to the surface, on which the metal forms metal particles.
FIG. 1(b) is a schematic representation of the procedure to trigger exsolution of metal from the metal oxide crystal lattice of the fuel electrode of a solid oxide cell by reduction in 5% $H_2/N_2$.
FIG. 1(c) is a schematic representation of the procedure to trigger exsolution of metal from the metal oxide crystal lattice of the fuel electrode of a solid oxide cell by applying 2 V across the cell, in accordance with the method of the invention.
Figure 1:
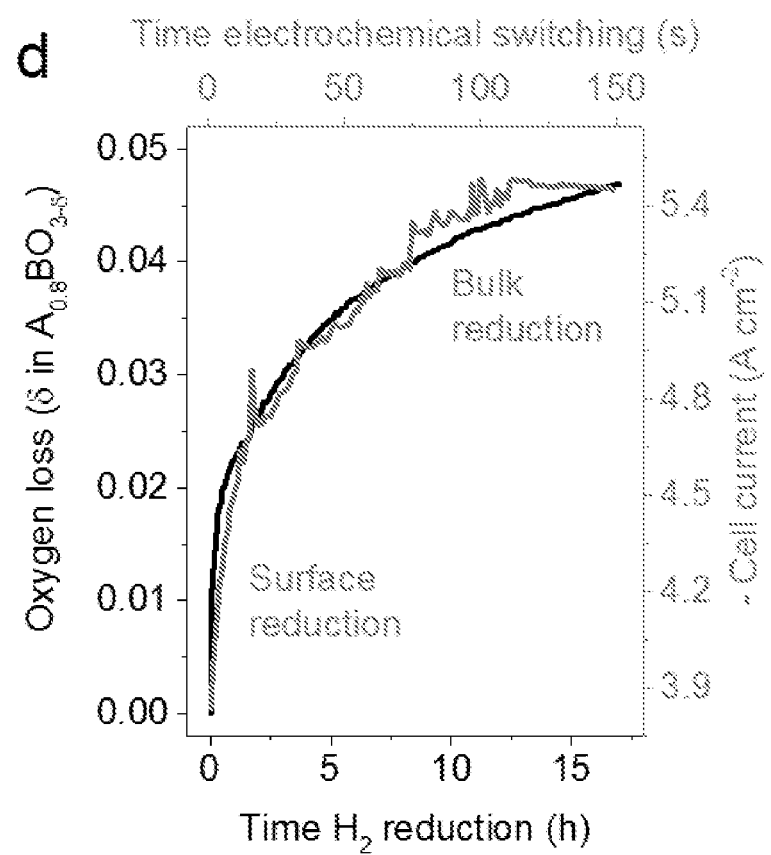
FIG. 1(d) provides thermogravimetric analysis (TGA) data showing oxygen loss upon reduction by hydrogen as a function of time for the process of FIG. 1(b) and cell current upon application of 2 V for the process of FIG. 1(c). The resultant cells are cells B and A as described in the examples section.
FIG. 1(e) is a SEM micrograph of a $La_{0.43}Ca_{0.37}Ni_{0.06}Ti_{0.94}O_{3-\delta}$-based electrode decorated with Ni metal particles produced by reduction of $La_{0.43}Ca_{0.37}Ni_{0.06}Ti_{0.94}O_{3-\gamma}$ by hydrogen at 900° C. for 20 h. This is the electrode of cell B as described in the examples section.
FIG. 1(f) is a SEM micrograph of a $La_{0.43}Ca_{0.37}Ni_{0.06}Ti_{0.94}O_{3-\delta}$-based electrode decorated with Ni metal particles produced by subjecting $La_{0.43}Ca_{0.37}Ni_{0.06}Ti_{0.94}O_{3-\gamma}$ to electrochemical switching, under 50% $H_2O/N_2$, at 900° C., for 150 s, in accordance with the method of the invention. This is the electrode of cell A as described in the examples section.
FIG. 1(g) is a SEM micrograph of a $La_{0.43}Ca_{0.37}Ni_{0.06}Ti_{0.94}O_{3-\delta}$ electrode produced by electrochemical switching, under 50% $H_2O/N_2$, at 900° C., for 150 s, after 100 h of fuel cell testing at 750° C. in 3% $H_2O/H_2$ at 0.7 V. This is electrode is cell C as described in the examples section.
FIG. 1(h) is a graph showing various characteristics of the electrodes of the SEM micrographs of FIGS. 1(e) to 1(g), i.e., the electrodes of cells A, B and C as described in the examples section, plotted in parallel coordinate system (errors are smaller than the points). Polarisation and series resistances are given at OCV.

In a first aspect, the invention provides a method of producing an electrode catalyst comprising applying an electric potential to a perovskite metal oxide.

As used herein, the "perovskite metal oxide" is a metal oxide having a perovskite structure, i.e. the same type of crystal structure as calcium titanium oxide ($CaTiO_3$). The general chemical formula for perovskite compounds is $ABX_3$, where 'A' and 'B' are two cations of very different sizes, and X is an anion that bonds to both. The 'A' atoms are larger than the 'B' atoms. The ideal cubic-symmetry structure has the B cation in 6-fold coordination, surrounded by an octahedron of anions, and the A cation in 12-fold cuboctahedral coordination; typically the perovskite structure is slightly distorted from ideal. "Perovskite metal oxide" is also referred to herein as the perovskite or perovskite oxide. As used herein, perovskite metal oxide lattice includes a metal oxide having a perovskite crystal structure and a perovskite metal oxide-based lattice includes a metal oxide having a perovskite-based crystal structure.

In one embodiment, the perovskite metal oxide has the formula

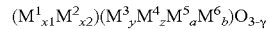

wherein
$M^1$ is a rare earth metal, preferably La, Y or a lanthanide,
$M^2$ is an alkaline earth metal,
$M^3$, $M^4$, $M^5$ and $M^6$ are each independently Al or a transition metal, and $M^3$ is
different from at least one of $M^4$, $M^5$ and $M^6$,
$0 \leq x1+x2 \leq 1$,
$0 < y \leq 1$,
$0 < z \leq 1$,
$0 \leq a \leq 1$,
$0 \leq b \leq 1$,
$y+z+a+b=1$, and
$0 \leq \gamma \leq 0.1$.
γ represents any slight oxygen deficiency in the perovskite metal oxide.

$M^3$ is different from at least one of $M^4$, $M^5$ and $M^6$. By this is meant $M^3$ is a different element to that of at least one of $M^4$, $M^5$ (when a>0) and $M^6$ (when b>0).

$M^4$, $M^5$ and $M^6$ can each independently be selected from the group consisting of Ti, Sc, V, Mn, Cr, Fe, Co, Ni, Cu, Zn, Zr, Nb, Mo, Ru, Rh, Pd, Cd, Ag, Pt, Au and Al.

In one embodiment, $M^3$ is selected from the group consisting of Ti, Cr, Fe, Al and Sc, and $M^4$, $M^5$ and $M^6$ are each independently chosen from the group consisting of Sc, Mn, Fe, Co, Ni, Cu, Zn, Zr, Nb, Mo, Ru, Rh, Pd, Cd, Ag, Pt, Au and Al. Thus, the perovskite metal oxide will have the formula:

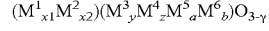

wherein
$M^1$ is a rare earth metal, preferably La, Y or a lanthanide,
$M^2$ is an alkaline earth metal,
$M^3$ is selected from the group consisting of Ti, Cr, Fe, Al and Sc,
$M^4$, $M^5$ and $M^6$ are each independently chosen from the group consisting of Ti, Sc, V, Mn, Cr, Fe, Co, Ni, Cu, Zn, Zr, Nb, Mo, Ru, Rh, Pd, Cd, Ag, Pt, Au and Al, and
$M^3$ is different from at least one of $M^4$, $M^5$ and $M^6$,
$0 \leq x1+x2 \leq 1$,
$0 < y \leq 1$,
$0 < z \leq 1$,
$0 \leq a \leq 1$,
$0 \leq b \leq 1$,
$y+z+a+b=1$, and
$0 \leq \gamma \leq 0.1$.
$M^1$ can be selected from the group consisting of La, Ce and Pr. In one embodiment $M^1$ is La.

$M^2$ can be selected from the group consisting of Ca, Sr and Ba. In one embodiment, $M^2$ is Ca.

$M^4$, $M^5$ and $M^6$ can each independently be chosen from the group consisting of Mn, Co, Ni, Cu, Zn, Zr, Nb, Mo, Ru, Rh, Pd, Cd, Ag, Pt and Au. $M^4$, $M^5$ and $M^6$ can each independently be chosen from the group consisting of Pd, Ni, Co and Fe.

Thus in one embodiment, the perovskite metal oxide has the formula

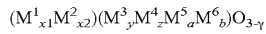

wherein
$M^1$ is selected from the group consisting of La, Ce and Pr,
$M^2$ is selected from the group consisting of Ca, Sr and Ba,
$M^3$ is selected from the group consisting of Ti, Cr, Fe, Al and Sc,
$M^4$, $M^5$ and $M^6$ are each independently chosen from the group consisting of Ti, Sc, V, Mn, Cr, Fe, Co, Ni, Cu, Zn, Zr, Nb, Mo, Ru, Rh, Pd, Cd, Ag, Pt, Au and Al or the group consisting of Co, Ni, Pd and Fe, and $M^3$ is different from at least one of $M^4$, $M^5$ and $M^6$,
$0 \leq x1+x2 \leq 1$,
$0 < y \leq 1$,
$0 < z \leq 1$,
$0 \leq a \leq 1$,
$0 \leq b \leq 1$,
$y+z+a+b=1$, and
$0 \leq \gamma \leq 0.1$.

In one embodiment, the perovskite metal oxide has the formula

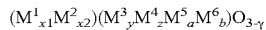

wherein
$M^1$ is La,
$M^2$ is Ca,
$M^3$ is Ti,
$M^4$, $M^5$ and $M^6$ are each independently be chosen from the group consisting of Co, Ni, Pd and Fe, and
$0 \leq x1+x2 \leq 1$,
$0 < y \leq 1$,
$0 < z \leq 1$,
$0 \leq a \leq 1$,
$0 \leq b \leq 1$,
$y+z+a+b=1$, and
$0 \leq \gamma \leq 0.1$.

In one embodiment, $a=0$ and $b=0$, and $M^4$ is chosen from the group consisting of Ni, Co and Fe, preferably $M^4$ is Ni or Fe.

In one embodiment, $a>0$ and $b=0$, and $M^4$ and $M^5$ are each independently chosen from the group consisting of Ni, Co and Fe, preferably one of $M^4$ and $M^5$ is Fe.

In one exemplary embodiment, the perovskite metal oxide has the formula $(La_{x1}Ca_{x2})(Ti_{1-y-z}Ni_y)O_{3-\gamma}$. Preferably x1 is 0.43, x2 is 0.37 and 1-y-z is 0.94.

In one embodiment $\gamma$ is 0.

The purpose of applying the electric potential to the perovskite metal oxide is to cause metal from the metal oxide lattice to move out of the lattice and form metal particles on the surface of the lattice. The process of the metal moving out of the metal oxide lattice is known as exsolving or exsolution. In essence, the method of the invention is a method of exsolving metal particles from a perovskite metal lattice. As the method of the invention involves an application of an electrical potential to the perovskite for a relatively short period of time, the method is also referred to herein as "electrochemical switching".

The magnitude of electrical potential applied to the perovskite metal oxide and the length of time it is applied are chosen so as the metal will exsolve from the surface and will vary dependent on the chosen perovskite metal oxide composition, operation temperature, gas composition, cell structure (e.g. component thickness and microstructure and composition). Typically, the electrical potential will be greater than 1 V and can be from 1.5 to 2.5 V. The electrical potential is defined with respect to a) an oxygen electrode of a solid oxide cell when the perovskite metal oxide is part of the solid oxide cell, or it can be b) chosen relative to the equivalent voltage of an equivalent electrode that would experience $pO_2$ values of less than $10^{-20}$ atm as calculated by the Nernst equation. Typically, the electrical potential is applied for 10 to 1000 seconds (s). The temperature of the electrode when the electrical potential is applied can be from 650 or 700 to 900 or 950° C.

The method of the invention provides for the growth of a finely dispersed array of anchored metal nanoparticles on the perovskite lattice. The metal particles may each be formed from a single metal or a mixture or an alloy of one or more metals. $M^4$, $M^5$ and $M^6$ as defined above represent the metals that can be exsolved from the perovskite oxide and form metal particles on the surface of same as a result of the method of the first aspect of the invention. Thus the metal particles can be particles of Mn, Co, Ni, Cu, Zn, Zr, Nb, Mo, Ru, Rh, Pd, Cd, Ag, Pt or Au, or of a mixture or alloy of two or more of same. In some cases the metal particles may be in the form of an oxide, for example when Mn and/or Zr is exsolved from the perovskite lattice. The metal particles can be particles of Co, Ni, Cu, Zn, Nb, Mo, Ru, Rh, Pd, Cd, Ag, Pt or Au, or of a mixture or alloy of two or more of same. The metal particles can be particles of Pd, Ni, Co or Fe, or of a mixture or alloy of two or more of same. The metal particles can be particles of Ni or Fe, or of a mixture or alloy of same. The resultant electrode catalyst can have a metal particle population of from 10, 100 or 200 to 600 particles $\mu m^{-2}$. The metal particles can have a size ranging from 5 to 100 or 115 nm.

In one embodiment, the perovskite metal oxide starting material is present in the electrode of a solid oxide cell and thus the method of the first aspect of the invention involves preparing the electrode catalyst in situ.

In a second aspect, the invention provides an electrode catalyst obtained or obtainable by the method of the first aspect of the invention. The electrode catalyst of the invention can be described as having the same molar formula as the perovskite metal oxide from which it is formed with $\delta$ representing any oxygen deficiency, i.e. as having the formula $(M^1_{x1}M^2_{x2})(M^3_yM^4_zM^5_aM^6_b)O_{3-\delta}$ where typically, $0 \leq \delta \leq 0.5$, where $M^1$, $M^2$, $M^3$, $M^4$, $M^5$, $M^6$, x1, x2, y, z, a and b are as defined above for the $(M^1_{x1}M^2_{x2})(M^3_yM^4_zM^5_aM^6_b)O_{3-\gamma}$. Thus the electrode catalyst can be described as comprising a perovskite metal oxide-based lattice supporting metal particles which has the formula $(M^1_{x1}M^2_{x2})(M^3_yM^4_zM^5_aM^6_b)O_{3-\delta}$ where typically, $0 \leq \delta \leq 0.5$, where $M^1$, $M^2$, $M^3$, $M^4$, $M^5$, $M^6$, x1, x2, y, z, a and b are as defined above for the $(M^1_{x1}M^2_{x2})(M^3_yM^4_zM^5_aM^6_b)O_{3-\gamma}$. The metal particles of the catalyst are as described above in relation to the first aspect of the invention.

In a third aspect, the invention provides an electrode comprising the electrode material of the invention. Preferably the electrode is the fuel electrode (i.e. the anode) of a solid oxide cell. These can be prepared by means known in the art.

In a fourth aspect, the invention provides a solid oxide cell comprising such an electrode. The solid oxide cell may be capable of performing in both fuel cell and electrolysis modes. In fuel cell mode, a fuel, for example $H_2$, is combined electrochemically with $O_2$ to produce power. In electrolysis mode, power is used to split $H_2O$ (or $CO_2$) electrochemically into $H_2$ (or CO) and $O_2$, effectively storing electrical energy in a fuel ($H_2$ or CO). Regardless of the mode in which they operate, solid oxide cells consist of three main components: two porous electrodes, the $H_2$ (fuel) and $O_2$ (air) electrodes, separated by a dense electrolyte. The solid oxide cell may have a layered fuel electrode|electrolyte|air electrode configuration. Typically the fuel electrode layer has a width of from 1 to 100 μm, the electrolyte layer has a width in the range of 5 to 100 or 1000 μm; and the air electrode layer has a width in the range of 1 to 100 μm. As used in this context, width of a layer refers to the thickness of the layer, i.e. as measured in a direction which stretches across the layers of the cell.

The fuel electrode may be an electrode according to the third aspect of the invention. The air electrode may be, for example, a manganate or cobaltate perovskite; examples of which are $La_{0.8}Sr_{0.2}MnO_3$ and $La_{0.6}Sr_{0.4}CO_{0.2}Fe_{0.8}O_3$, respectively. The electrolyte may be oxide conducting ceramic, for example yttria substituted zirconia, or a proton conducting ceramic such as barium cerate. In one embodiment, the fuel electrode|electrolyte|air electrode configuration comprises the following layers LCNT|ScSZ|LSM-ScSZ, where LCNT is $La_{0.43}Ca_{0.37}Ni_{0.06}Ti_{0.94}O_3$, ScSZ is $(La_{0.8}Sr_{0.2})_{0.95}MnO_3$ and LSM is $Zr_{0.89}Sc_{0.1}Ce_{0.01}O_{2-\delta}$.

In another aspect, the invention provides a method of regenerating an electrode catalyst according to the second aspect of the invention, which method comprises applying an electrical potential to the electrode catalyst. This method is also described as "electrochemical switching" and the conditions under which it is carried out are the same as those described for the method of the first aspect of the invention. The method of this aspect of invention differs from the method of the first aspect in that the material being subjected to the electrical potential is an electrode catalyst, preferably an electrode catalyst that has been used. This regeneration method can be carried out in situ, i.e. under cell operating conditions and thus provides an efficient way to revive the cell.

The method of the invention provides for the growth of a finely dispersed array of anchored metal nanoparticles on an oxide electrode in a SOC through electrochemical poling of the SOC; it has been found that, in accordance with the method of the invention, electrochemical poling of an SOC at 2V for a few seconds, can yield a sevenfold increase in fuel cell maximum power density. These new electrode structures are capable of delivering high performances in both fuel cell and electrolysis mode (e.g. 2 $Wcm^{-2}$ in humidified $H_2$ and 2.75 $Acm^{-2}$ at 1.3 V in 50% $H_2O/N_2$, at 900° C.). Furthermore, it has been found that the nanostructures and corresponding electrochemical activity of the SOCs show excellent resistant to degradation; examples show no degradation over 150 hours of testing. The results presented herein not only prove that in operando treatments can yield emergent nanomaterials, which in turn deliver exceptional performance, but also provide proof of concept that electrolysis and fuel cells can be unified in a single, high performance, versatile and easily manufacturable device.

This opens exciting new possibilities for simple, quasi-instantaneous production of highly active nanostructures for reinvigorating SOC cells during operation.

The advantageous properties of the method and electrode material of the invention are discussed below in relation to the following non-limiting examples.

EXAMPLES

Methods

Manufacture of Solid Oxide Cells.

The perovskite $La_{0.43}Ca_{0.37}Ni_{0.06}Ti_{0.94}O_3$ (LCNT) was prepared by a modified solid state reaction described in detail previously.[9] The as-prepared perovskite was milled in acetone in a planetary ball mill at 300 rpm for 2 h. LCNT and $Zr_{0.89}Sc_{0.1}Ce_{0.01}O_{2-\gamma}$ (LSM) $(La_{0.8}Sr_{0.2})_{0.95}MnO_3$ (ScSZ) (50:50 wt %) inks were made by mixing corresponding powders with Terpinol, KD1 dispersant, and PVB (polyvinyl butyrate) in a planetary miller for 2 h. The inks were screen-printed in a 0.5 $cm^2$ active area on either sides of 18 mm diameter, 80 and 140 μm thick (±2 μm) ScSZ button cells, in the fuel electrode|electrolyte|air electrode configuration of LCNT (10 μm)|ScSZ (80 or 140 μm)|LSM-ScSZ (20 μm). ScSZ electrolyte supports were fabricated by tape-casting and sintering at 1400° C. LCNT was screen-printed first on one side of ScSZ and then fired at 1200° C. The LSM-ScSZ ink was then screen-printed on the other side and fired 1100° C., gold mesh was used for current collection from both electrodes. At this stage the LCNT electrode is referred to herein as "fresh", i.e. with no exsolved metal particles. The cell was either then subject to reduction by hydrogen or subject to application of a voltage, i.e. electrochemical switching. Ex-situ perovskite oxide reduction by hydrogen was carried out in a controlled atmosphere furnace, under continuous flow of 5% $H_2/N_2$, at the temperatures indicated, with heating and cooling rates of 5° C. $min^{-1}$. Electrochemical switching was triggered by applying a 2 V potential (vs air electrode).

The following solid oxide cells of configuration LCNT (10 μm)|ScSZ (80 or 140 μm) LSM-ScSZ (20 μm) were prepared:

| Cell | Width of ScSZ layer | Exsolution process details |
| --- | --- | --- |
| A | 140 μm | an electrical potential of 2 V is applied across the cell under a continuous flow of 50% $H_2O/N_2$ at 900° C. for 150 s. |
| A1 | 80 μm | an electrical potential of 2 V is applied across the cell under a continuous flow of 50% $H_2O/N_2$ at 900° C. for 150 s. |
| B | 140 μm | the cell is exposed to reduction by hydrogen at 900° C. for 20 h in a controlled atmosphere furnace, under continuous flow of 5% $H_2/N_2$, with heating and cooling rates of 5° C. $min^{-1}$. |
| C | 140 μm | an electrical potential of 2 V is applied across the cell under a continuous flow of 50% $H_2O/N_2$ at 900° C. for 150 s. |

To illustrate the regeneration method of the invention, after 100 h of fuel cell testing at 750° C. in 3% $H_2O/H_2$ at 0.7 V, an electrical potential of 2 V is applied across cell C under a continuous flow of 50% $H_2O/N_2$ at 900° C. for 150 s.

Structural Characterisation.

The phase purity and crystal structure of the prepared perovskite was confirmed by using a PANalytical Empyrean X-ray Diffractometer operated in reflection mode. High-resolution secondary and backscattered electron images were obtained using a FEI Scios electron microscope. TEM and EDS analysis were carried out on a JEOL JEM-2010 electron microscope. The exsolution characteristics, i.e. the characteristics of the perovskites after exsolution, plotted in FIG. 1h were obtained as follows. Sufficiently flat, large enough areas oriented parallel to the viewing plane were identified. Secondary and backscattered electron images were then collected and analysed in Mathematica 10 for Windows. The SEM images were converted to binary images where particles were outlined based on pixel contrast. From this, the number of particles as well as individual particle diameter can be calculated and therefore particles size distribution and the total amount of metal atoms contained within the particles by summation over the entire area. The exsolution depth was estimated by calculating the depth of a perovskite slab of equivalent area that would contain the observed amount of exsolved Ni atoms and assuming that only half of the Ni atoms exsolve (based on a previous report[9]). Multiple areas were subjected to this analysis for each sample and the average values were plotted in FIG. 1h.

Electrochemical Characterisation.

The cells were mounted in a SOC testing jig equipped with gas control system. This included gas mass flow controllers ($H_2$, $N_2$), a pressurised liquid water supply, liquid flow meter, a controlled evaporator mixer and dew point probes, as described in detail previously.[11] Currentvoltage (I-V) and impedance characteristics of the cells were measured in a 2-electrode, full-device arrangement and polarisation of the cell were analyzed with a Solartron 1280 B instrument. Electrochemical data were collected over the temperature range 700 and 900° C. in three different gas conditions: in 50% $H_2O/N_2$ for the cell operating in electrolysis mode (EC), 3% $H_2O/H_2$ for the cell operating in fuel cell mode (FC); and 50% $H_2O/H_2$ for the cell operating in reversible cell mode (RC). Air was continuously passed over the air electrode during FC, EC and RC experiments. For the EC/RC tests, 19.4 g h$^{-1}$ of water and 500 mL min$^{-1}$ of $N_2$ or $H_2$ were supplied. For the FC tests, 100 mL min$^{-1}$ of $H_2$ was supplied after passing through a water bubbler. Electrochemical switching was triggered by applying a 2 V potential (vs air electrode). After current equilibration (FIG. 1d), sweep voltammetry was conducted from 2 V (or from 1.7 V) to 0 V at a scan rate of 15 mV s$^{-1}$ for the EC/RC tests. For the FC tests, after stabilization in OCV condition, voltammetry was scanned from OCV to 0 V. Impedance data were collected under 50 mV AC perturbation amplitude at 1.3 V, OCV, 0.7 V bias between 20000 and 2 Hz.

Oxygen Loss on Reduction Calculation.

The oxygen loss on reduction in FIG. 1d was calculated from TGA based on the equation derived below. Upon reduction, a perovskite will lose oxygen, i.e. $ABO_3$ to $ABO_{3-\delta}$, with the corresponding change of mass from $m_{ABO_3}$ to $m_{ABO_{3-\delta}}$. Since the number of moles of perovskite is conserved, the following equality can be written:

$$\frac{m_{ABO_3}}{\mu_{ABO_3}} = \frac{m_{ABO_{3-\delta}}}{\mu_{ABO_{3-\delta}}} \qquad \text{Eqn. 4}$$

Where $\mu_{ABO_3}$ and $\mu_{ABO_{3-\delta}}$ represent the molar weights of the oxidised and reduced perovskite respectively. This can also be written as:

$$\frac{m_{ABO_3}}{\mu_{ABO_3}} = \frac{m_{ABO_{3-\delta}}}{\mu_{ABO_3} - \delta \cdot A_O} \qquad \text{Eqn. 5}$$

Where $A_O$ is the atomic weight of oxygen. The weight loss observed by TGA is given by:

$$\Delta m = \frac{m_{ABO_3} - m_{ABO_{3-\delta}}}{m_{ABO_3}} \qquad \text{Eqn. 6}$$

Thus, the extent of reduction (oxygen loss on reduction) is:

$$\delta = \frac{\mu_{ABO_3}}{A_O} \cdot \Delta m \qquad \text{Eqn. 7}$$

The examples of relate to electrolyte supported cells with the configuration $La_{0.43}Ca_{0.37}Ni_{0.06}Ti_{0.94}O_{3-\delta}$ (~10 μm)|$Zr_{0.89}Sc_{0.1}Ce_{0.01}O_{2-\delta}$ (~80 or 140 μm)|$Zr_{0.89}Sc_{0.1}Ce_{0.01}O_{2-\delta}$—$(La_{0.8}Sr_{0.2})_{0.95}MnO_{3-\delta}$ (~20 μm). Typically, $0<\delta<0.5$. In the examples according to the invention, the fuel electrodes are produced by the voltage driven reduction method of the invention. In the comparative examples, the fuel electrodes are produced by reduction by hydrogen.

Figure 1E:
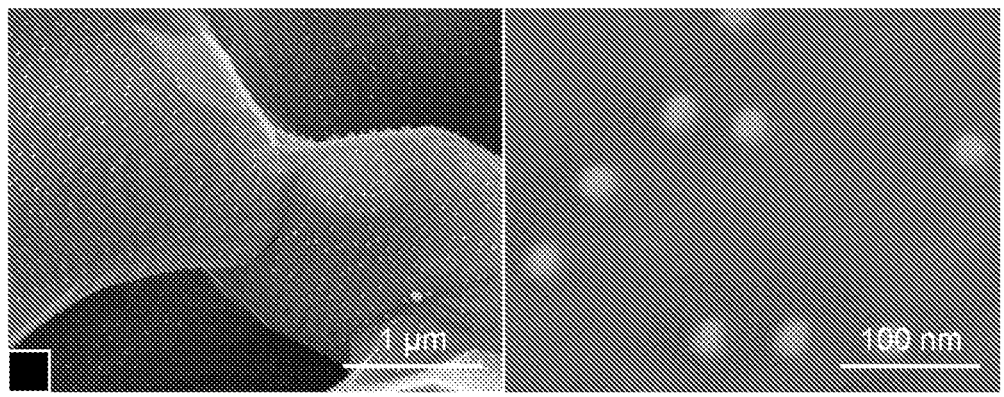
Figure 1F:
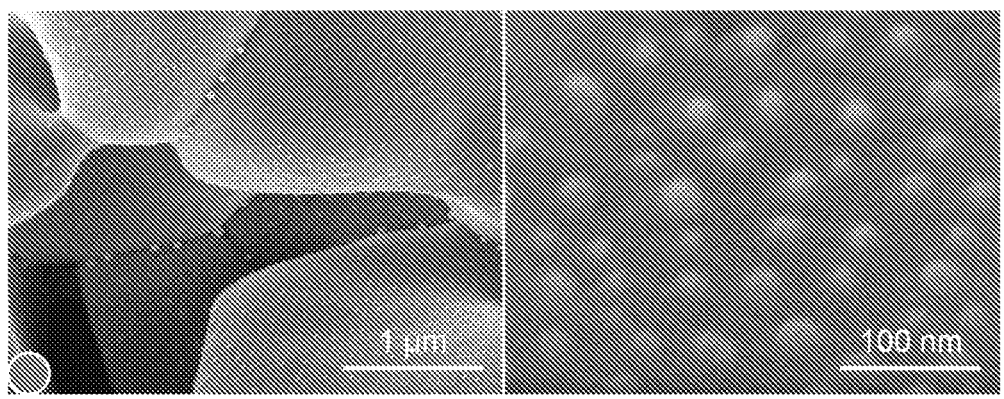

FIG. 1d follows the reduction/exsolution kinetics of two fresh LCNT samples (i.e. with no exsolved particles) at 900° C., upon exposure to reducing atmosphere (5% $H_2/N_2$, FIG. 1b) and upon application of a 2 V potential (50% $H_2O/N_2$, FIG. 1c). The reduction kinetics observed is typical for titanate systems and implies two processes, one fast and one slow, corresponding to surface and bulk reduction,[12] as highlighted. This figure indicates that while the kinetics of the two processes follows the same law, they require significantly different time scales to reach equilibrium. That is, voltage-driven reduction occurs about two orders of magnitude faster than conventional reduction by hydrogen, virtually instantly, hence the term "electrochemical switching". Representative microstructures obtained through these two processes are shown in FIGS. 1e and 1f, respectively. While both samples exsolved Ni metal particles, it is evident that voltage-driven reduction produced significantly richer nanostructures.

To assist with a more quantitative comparison of these microstructures and their utility, a series of corresponding parameters are plotted in FIG. 1h in a parallel coordinate system. Examination of FIGS. 1d and 1h indicates that as compared to conventional reduction by hydrogen, electrochemical switching required significantly less time to complete (~150 s vs >17 h); led to higher extent of exsolution (~$3.7 \cdot 10^{-7}$ vs ~$6.2 \cdot 10^{-7}$ Ni atoms μm$^{-2}$); produced 4 times higher particle population (370 vs 90 particles μm$^{-2}$) at a smaller average particle size (15 vs 20 nm); and overall resulted in seven-fold increase in maximum fuel cell power density (1.4 vs 0.2 W cm$^{-2}$). It should be noted that this dramatic enhancement of the cell performance was due to the 'switching on' of the fuel electrode since the air electrode exhibited negligible polarisation resistance to start with. This brief comparison clearly demonstrates the immense potential of electrochemical switching to deliver virtually instant peak performance without the need for additional processing time and resources like in conventional approaches such as chemical infiltration or even exsolution by hydrogen reduction.

To understand the similarities and differences between gas and voltage-driven reduction, we briefly discuss the above results in the light of the exsolution mechanism. Exsolution from perovskites is a process driven by lattice reduction and controlled by bulk and surface defects and external conditions[7-9]. Upon exposure to reducing atmosphere (e.g., $H_2$) oxygen ions are stripped from the oxide lattice resulting in mass loss (FIG. 1d), while electrons and oxygen vacancies are doped into the lattice (Eqn. 1). As reduction progresses, electrons gradually lower the average oxidation state of reducible ions (e.g. Eqn. 2) while oxygen vacancies destabilise lattice stoichiometry, which combined favour metal nucleation at the surface (Eqn. 3)[8]. Growth and/or additional nucleation are sustained by draining exsolvable ions to the surface from deeper inside the bulk (FIG. 1a) until an equilibrium is reached or (near-) surface reorganisation limits the process kinetically.[9] For example, the estimated cation diffusion/exsolution depth for the gas and voltage-driven reduced samples are on the order of 80 and 130 nm, respectively (FIG. 1h).

$$O^{2-} \rightarrow V_O^{\cdot\cdot} + 2e^- + \tfrac{1}{2}O_2 \qquad \text{(Eqn. 1)}$$

$$e^- + Ti^{4+} \rightarrow Ti^{3+} \qquad \text{(Eqn. 2)}$$

$$2e^- + Ni^{2+} \rightarrow Ni^0 \qquad \text{(Eqn. 3)}$$

As noted above, the similar shape of the reduction curves in FIG. 1d indicates that exsolution by electrochemical switching follows the same law and therefore the same phenomenology as reduction by hydrogen, but on a much shorter time scale. The shared phenomenology is due to the two processes having the same driving force, that is the $pO_2$ gradient between the oxide lattice and external environment which leads to lattice reduction (e.g. Eqn. 1) and subsequent exsolution. The kinetics relate to the much lower $pO_2$ differential experienced by the sample when exposed to reducing atmosphere, typically $pO_2 \sim 10^{-19}$ atm, as compared to the $pO_2$ achieved through voltage application which is estimated at $\sim 10^{-35}$ atm from the Nernst equation. However, in spite of this tremendous $pO_2$ differential, exsolution still occurs in a very controlled fashion which makes electrochemical switching an appealing method for selective and highly targeted particle growth. The kinetics probably also dictate the particle characteristics observed in FIG. 1h. As compared to the slow reduction under hydrogen (FIG. 1d), the sudden flooding of the perovskite lattice with electrons during voltage application greatly favours particle nucleation, leading to small, yet numerous particles. Additionally, it should be noted that voltage-driven reduction does not only 'switch on' the catalyst (i.e. Ni particles), but also the other two essential functionalities required for high electrochemical performance, namely electronic and ionic conductivity via the respective carrier-generating process in Eqn. 1.

To illustrate the utility and functional capabilities of electrochemical switching, its application was exemplified for a SOC operating in electrolysis (EC), fuel cell (FC) and also reversible cell (RC) mode. Cell performances are further improved, as shown in FIG. 1h, by preparing a cell with thinner electrolyte (80 vs 140 μm). EC was tested in 50% $H_2O/N_2$, FC in 3% $H_2O/H_2$ and RC in 50% $H_2O/H_2$, collecting current-voltage (I-V) curves between 700 and 900° C. In EC mode, at 1.3 V (thermo-neutral voltage for steam electrolysis), current densities of between −0.22 and −2.75 A cm$^{-2}$ are observed at 700 and 900° C., respectively (FIG. 2a). It should be noted here these high values were achieved without having to use $H_2$ in the EC gas feed, in contrast to most literature studies which employ this practice to prevent electrode oxidation. When the same device was switched to FC mode, maximum power densities of 0.37 to 1.97 W cm$^{-2}$ were obtained at 700 and 900° C., respectively (FIG. 2b). These values are comparable to those reported recently for cells using infiltrated $PrBaMn_2O_{5+\delta}$ perovskite (1.77 W cm$^{-2}$ at 850° C.), although it should be noted that higher performance electrolyte and air electrode materials were used in that study[10]. When operated in RC mode at 1.3/0.8 V at 800° C. the cell of the invention showed similar performance (−0.9/+0.4 A cm$^{-2}$, see FIG. 2c) to a cermet-based electrode-supported cell (−1/+0.5 A cm$^{-2}$), with 40 vol % Ni-YSZ|YSZ(15 μm)|LSM-YSZ,[2] even though our cell had a thicker electrolyte (80 vs 15 μm) and considerably less Ni content (2 wt % vs 40 vol %). Overall, the performances of SOCs of the invention compare favorably with best-in-class devices to date.

Figure 1G:
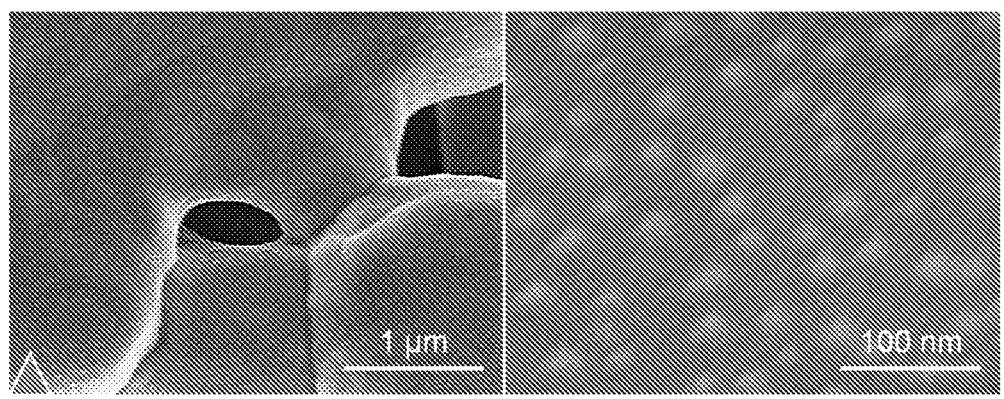
Figure 1:
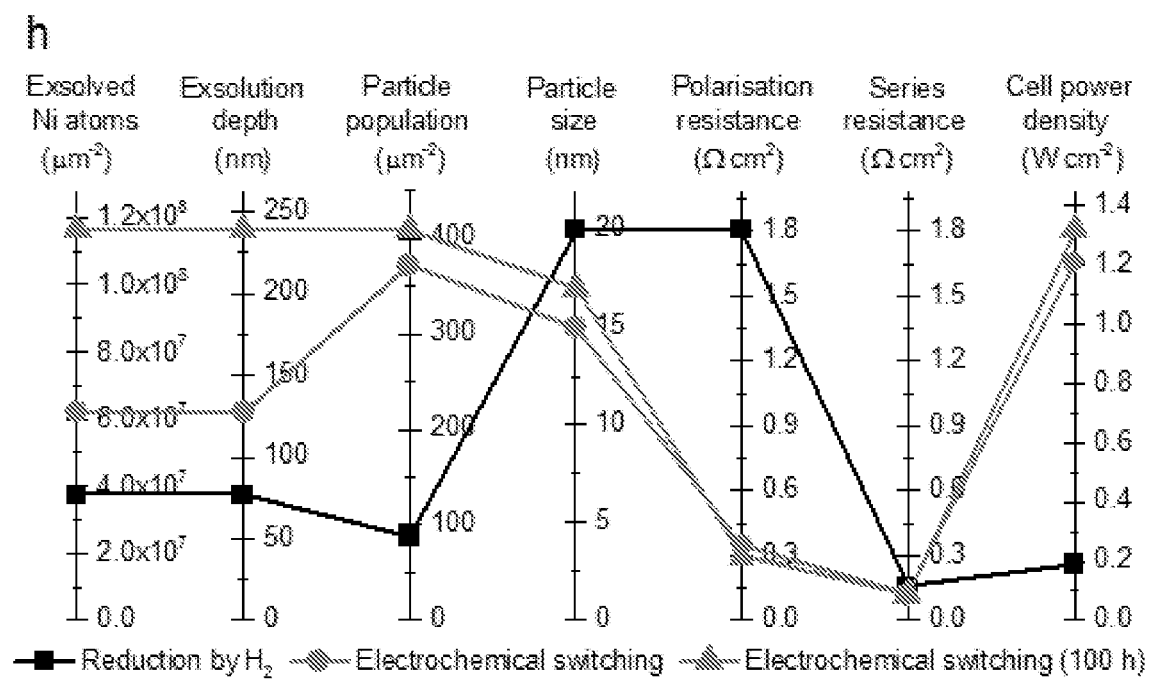

One of the main concerns when using supported nanoparticle systems is their susceptibility to coarsening and thus deactivation over time. FIGS. 1g and 1h show the microstructure and corresponding characteristics of a sample similar to FIG. 1f after 100 h of operation at 750° C. in FC mode. These figures indicate that in spite of the small initial particles size (~15 nm) and close proximity to each other, there was no noticeable particle agglomeration. In fact, over the 100 h period additional metal exsolved (from ~130 to ~240 nm deep) increasing particle population and size by about 10%, which resulted in slightly improved polarization resistance and maximum power density (FIG. 1h). While the remarkable stability of exsolved nanoparticles has been reported before and attributed to their socketed nature[9], the results here reveal an unexpected role for these materials, acting as 'slow release systems', and thus compensating for potential loss of active sites due to coarsening.

Figure 2:
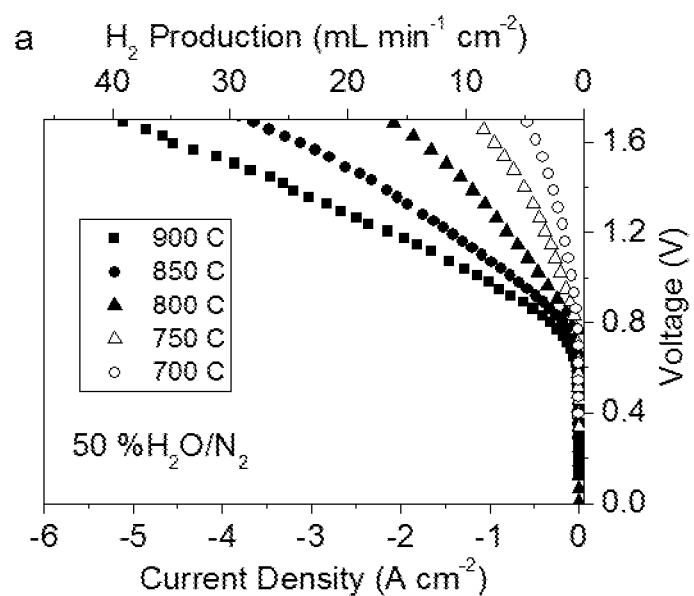
FIG. 2(a) is a current voltage curve illustrating operation at different temperatures in electrolysis mode under 50% $H_2O/N_2$, also showing the equivalent $H_2$ production assuming 100% Faradaic efficiency. The cell used is cell A1 as described in the examples section.
FIG. 2(b) is a current voltage curve illustrating operation at different temperatures in fuel cell mode in 3% $H_2O/H_2$, also showing cell power curves (circle symbols). The cell used is cell A1 as described in the examples section.
FIG. 2(c) is a current voltage curve illustrating operation at different temperatures in reversible cell mode in 50% $H_2O/H_2$. The cell used is cell A1 as described in the examples section.
Figure 2B:
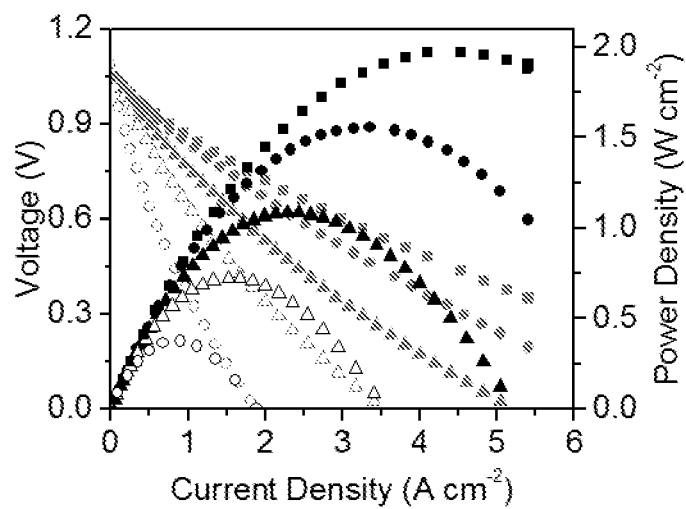
Figure 2C:
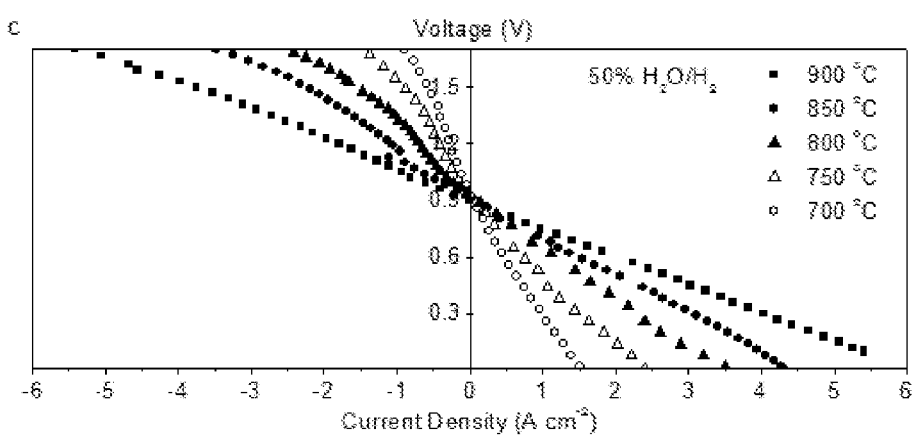
Figure 3:
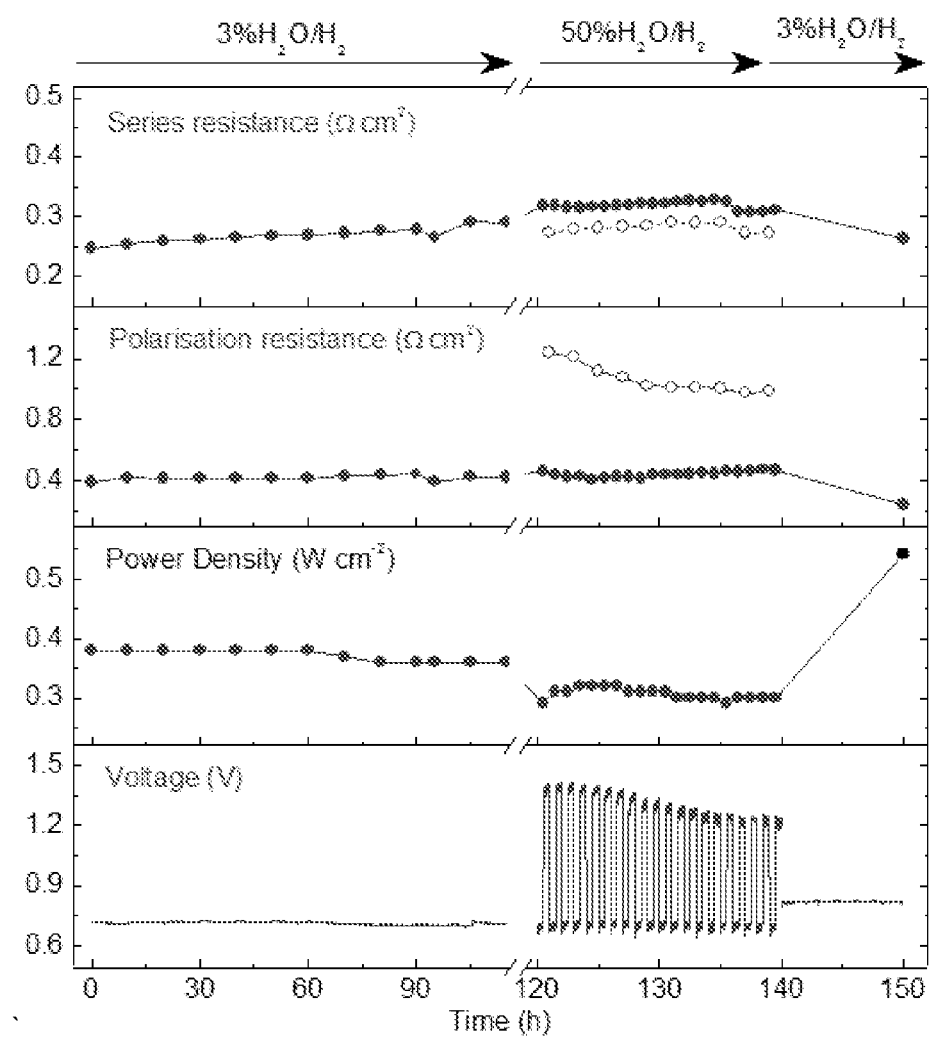
FIG. 3 is a graph of cell voltage, power density, polarisation resistance and series resistance over time at 700° C. for a cell A1 as described in the examples section. Rs and Rp were measured for fuel cell modes (filled symbols) in two different gases at 0.7 V and for electrolysis mode (empty symbols) at 1.3 V, respectively. The galvanostatic segment in fuel cell mode was carried out in 3% $H_2O/H_2$ under an applied 0.4 A cm$^{-2}$, and the 20-cyclic fuel cell/electrolysis test was conducted in 50% $H_2O/H_2$ at +0.3/−0.2 A cm$^{-2}$.

To further test the stability of cells based on the electrochemical switching concept, the same sample shown in FIG. 2 which was operated in EC, FC, and RC modes, was also subjected to a long term test at 700° C. (FIG. 3). Consistent with the other stability test this sample showed no degradation and further improved its FC performance from 0.38 to 0.54 W cm$^{-2}$ at 700° C. after EC/RC mode, suggesting, as shown above that additional particles were exsolved in the process. This was also confirmed by a drop in electrode polarisation from 0.42 to 0.24 Ωcm$^{-2}$ as shown in Supplementary FIG. 6.

In a further test, an electrode catalyst of the invention having the formula $La_{0.43}Ca_{0.37}Ni_{0.06}Ti_{0.94}O_3$ was used in the cathode of a solid oxide cell which, when performing in electrolysis mode, successfully electrolysed undiluted $CO_2$. In another further test, an electrode catalyst of the invention having the formula $La_{0.43}Ca_{0.37}Fe_{0.03}Ni_{0.03}Ti_{0.94}O_3$ was used in the cathode of a solid oxide cell which, when performing in electrolysis mode, successfully electrolysed undiluted $CO_2$.

In conclusion, electrochemical switching offers not only a new route to robust, high-performance nanostructures and SOC devices, but also brings unprecedented simplifications for their preparation. This has applications in particular with high temperature electrochemical devices.

REFERENCES

1. Irvine, J. T. S. et al. Evolution of the electrochemical interface in high-temperature fuel cells and electrolysers. Nat. Energy 1, 15014 (2016).
2. Graves, C., Ebbesen, S. D., Jensen, S. H., Simonsen, S. B. & Mogensen, M. B. Eliminating degradation in solid oxide electrochemical cells by reversible operation. Nat. Mater. 14, 239-244 (2015).
3. Irvine, J. T. S. & Connor, P. in Solid Oxide Fuels Cells: Facts and Figures (eds. Irvine, J. T. S. & Connor, P.) 163-180 (Springer London, 2013).

4. Jiang, S. P. A review of wet impregnation—An alternative method for the fabrication of high performance and nano-structured electrodes of solid oxide fuel cells. *Mater. Sci. Eng. A* 418, 199-210 (2006).
5. Jung, W., Gu, K. L., Choi, Y. & Haile, S. M. Robust nanostructures with exceptionally high electrochemical reaction activity for high temperature fuel cell electrodes. *Energy Environ. Sci.* (2014). doi:10.1039/c3ee43546f
6. Nishihata, Y. et al. Self-regeneration of a Pd-perovskite catalyst for automotive emissions control. *Nature* 418, 164-167 (2002).
7. Kobsiriphat, W. et al. Nickel- and Ruthenium-Doped Lanthanum Chromite Anodes: Effects of Nanoscale Metal Precipitation on Solid Oxide Fuel Cell Performance. *J. Electrochem. Soc.* 157, B279B284 (2010).
8. Neagu, D., Tsekouras, G., Miller, D. N., Ménard, H. & Irvine, J. T. S. In situ growth of nanoparticles through control of non-stoichiometry. *Nat. Chem.* 5, 916-923 (2013).
9. Neagu, D. et al. Nano-socketed nickel particles with enhanced coking resistance grown in situ by redox exsolution. *Nat. Commun.* 6, (2015).
10. Sengodan, S. et al. Layered oxygen-deficient double perovskite as an efficient and stable anode for direct hydrocarbon solid oxide fuel cells. *Nat. Mater.* 14, 205-209 (2014).
11. Tsekouras, G. & Irvine, J. T. S. The role of defect chemistry in strontium titanates utilised for high temperature steam electrolysis. *J. Mater. Chem.* (2011). doi: 10.1039/c1jm11313e
12. Neagu, D. & Irvine, J. T. S. Structure and Properties of $La_{0.4}Sr_{0.4}TiO_3$ Ceramics for Use as Anode Materials in Solid Oxide Fuel Cells. *Chem. Mater.* 22, 5042-5053 (2010).

The invention claimed is:

1. A method of producing an electrode catalyst comprising:
    applying an electric potential to a perovskite metal oxide lattice;
    causing one or more metals from the perovskite metal oxide lattice to exsolve while applying the electric potential; and
    forming metal particles of the one or more metals on a surface of the perovskite metal oxide lattice.
2. A method according to claim 1, wherein the perovskite metal oxide has the formula:

$$(M^1_{x1}M^2_{x2})(M^3_yM^4_zM^5_aM^6_b)O_{3-\delta}$$

wherein
    $M_1$ is a rare earth metal,
    $M^2$ is an alkaline earth metal,
    $M^3$, $M^4$, $M^5$ and $M^6$ are each independently Al or a transition metal, and $M^3$ is different from at least one of $M^4$, $M^5$ and $M^6$,
    $0 \leq x1+x2 \leq 1$,
    $0 < y \leq 1$,
    $0 < z \leq 1$,
    $0 \leq a \leq 1$,
    $0 \leq b \leq 1$,
    $y+z+a+b=1$, and
    $0 \leq \gamma \leq 0.1$.
3. A method according to claim 2, wherein $M^1$ is selected from the group consisting of La, Ce and Pr; $M^2$ is selected from the group consisting of Ca, Sr and Ba; $M^3$ is selected from the group consisting of Ti, Cr, Fe, Al and Sc; $M^4$, $M^5$ and $M^6$ are each independently chosen from the group consisting of Ti, Sc, V, Mn, Cr, Fe, Co, Ni, Cu, Zn, Zr, Nb, Mo, Ru, Rh, Pd, Cd, Ag, Pt, Au and Al; and $M^3$ is different from at least one of $M^4$, $M^5$ and $M^6$.
4. A method according to claim 2, wherein $M^2$ is Ca.
5. A method according to claim 3, wherein $M^2$ is Ca.
6. A method according to claim 1 comprising applying an electrical potential of from 1.5 to 2.5 volts to the perovskite metal oxide.
7. An electrode catalyst obtained or obtainable by the method of claim 1.
8. An electrode comprising the electrode catalyst of claim 7.
9. A solid oxide cell comprising an electrode according to claim 8.
10. A method of operating the solid oxide cell of claim 9 in fuel cell mode comprising combining $H_2$ and $O_2$ electrochemically to produce power.
11. A method of regenerating an electrode catalyst according to claim 7, which method comprises applying an electrical potential to the electrode catalyst.
12. A method according to claim 11, comprising applying an electrical potential to an electrode comprising said electrode catalyst, which electrode is in a solid oxide cell, under solid oxide cell operating conditions.
13. A method according to claim 1, wherein the metal particles have a population of from 100 to 600 particles $\mu m^{-2}$.
14. A method of of producing an electrode catalyst comprising:
    applying an electric potential to a perovskite metal oxide lattice;
    causing one or more metals from the perovskite metal oxide lattice to exsolve while applying the electric potential; and
    forming metal particles of the one or more metals on a surface of the perovskite metal oxide lattice, wherein the perovskite metal oxide lattice has the formula:

$$(M^1_{x1}M^2_{x2})(M^3_yM^4_zM^5_aM^6_b)O_{3-\delta}$$

wherein
    $M^1$ is a rare earth metal,
    $M^2$ is calcium,
    $M^3$, $M^4$, $M^5$ and $M^6$ are each independently Al or a transition metal, and $M^3$ is different from at least one of $M^4$, $M^5$ and $M^6$,
    $0 \leq x1+x2 \leq 1$,
    $0 < y \leq 1$,
    $0 < z \leq 1$,
    $0 \leq a \leq 1$,
    $0 \leq b \leq 1$,
    $y+z+a+b=1$, and
    $0 \leq \gamma \leq 0.1$.
15. A method according to claim 14, wherein the population of the metal particles is from 100 to 600 particles $\mu m^{-2}$.
16. A method of producing an electrode catalyst comprising:
    applying an electric potential to a perovskite metal oxide lattice;
    causing one or more metals from the perovskite metal oxide lattice to exsolve while applying the electric potential; and
    forming metal particles of the one or more metals on a surface of the perovskite metal oxide lattice;
    wherein the perovskite metal oxide has the formula:

$$(M^1_{x1}M^2_{x2})(M^3_yM^4_zM^5_aM^6_b)O_{3-\delta}$$

wherein
M$^1$ is a rare earth metal,
M$^2$ is an alkaline earth metal,
M$^3$, M$^4$, M$^5$ and M$^6$ are each independently aluminum (Al) or a transition metal,
and M$^3$ is different from at least one of M$^4$, M$^5$ and M$^6$,
$0 \leq x1+x2 \leq 1$,
$0 < y \leq 1$,
$0 < z \leq 1$,
$0 \leq a \leq 1$,
$0 \leq b \leq 1$,
$y+z+a+b=1$, and
$0 \leq \gamma \leq 0.1$.

* * * * *

UNITED STATES PATENT AND TRADEMARK OFFICE
CERTIFICATE OF CORRECTION

| | | |
|---|---|---|
| PATENT NO. | : 11,271,216 B2 | Page 1 of 1 |
| APPLICATION NO. | : 16/316250 | |
| DATED | : March 8, 2022 | |
| INVENTOR(S) | : John T. S. Irvine et al. | |

It is certified that error appears in the above-identified patent and that said Letters Patent is hereby corrected as shown below:

In the Claims

In Column 13, Claim 2, Line 47 change the formula to read:
$(M^1_{x1}M^2_{x2})(M^3_yM^4_zM^5_aM^6_b)O_{3-\gamma}$ In Column 14, Claim 14, Line 39 change the formula to read:
$(M^1_{x1}M^2_{x2})(M^3_yM^4_zM^5_aM^6_b)O_{3-\gamma}$ In Column 14, Claim 16, Line 67 change the formula to read:
$(M^1_{x1}M^2_{x2})(M^3_yM^4_zM^5_aM^6_b)O_{3-\gamma}$ Signed and Sealed this
Nineteenth Day of July, 2022

Katherine Kelly Vidal
*Director of the United States Patent and Trademark Office*